(12) United States Patent
Harada (10) Patent No.: US 11,872,695 B2
(45) Date of Patent: Jan. 16, 2024

(54) GAS SPRING MAINTENANCE MANAGEMENT APPARATUS, ROBOT SYSTEM, AND GAS SPRING MAINTENANCE MANAGEMENT METHOD

(71) Applicant: FANUC CORPORATION, Yamanashi (JP)

(72) Inventor: Shizuo Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 353 days.

(21) Appl. No.: 17/014,050

(22) Filed: Sep. 8, 2020

(65) Prior Publication Data

US 2021/0107171 A1 Apr. 15, 2021

(30) Foreign Application Priority Data

Oct. 11, 2019 (JP) .................. 2019-187692

(51) Int. Cl.
*B25J 19/00* (2006.01)
*B25J 9/16* (2006.01)
*B25J 9/10* (2006.01)
*B25J 13/08* (2006.01)

(52) U.S. Cl.
CPC ............. *B25J 19/0066* (2013.01); *B25J 9/10* (2013.01); *B25J 9/1674* (2013.01); *B25J 9/1694* (2013.01); *B25J 13/087* (2013.01); *B25J 19/0016* (2013.01)

(58) Field of Classification Search
CPC ........ B25J 19/0066; B25J 9/10; B25J 9/1674; B25J 9/1694; B25J 13/087; B25J 19/0016; B25J 19/0012
See application file for complete search history.

(56) References Cited

U.S. PATENT DOCUMENTS

| 6,408,225 | B1* | 6/2002 | Ortmeier | B25J 19/0012 700/254 |
| 2008/0023451 | A1* | 1/2008 | Salsich | B23K 10/006 219/121.48 |
| 2010/0212305 | A1* | 8/2010 | Runesson | B25J 19/0012 60/459 |
| 2012/0065781 | A1* | 3/2012 | Ikeda | B25J 9/1674 700/261 |
| 2014/0290414 | A1* | 10/2014 | Hasuo | B25J 19/0012 74/490.01 |
| 2014/0297032 | A1* | 10/2014 | Hayashi | B25J 19/0012 700/245 |

(Continued)

FOREIGN PATENT DOCUMENTS

| EP | 3 427 908 A1 | 1/2019 |
| JP | H08-313322 A | 11/1996 |

(Continued)

*Primary Examiner* — Kira Nguyen
(74) *Attorney, Agent, or Firm* — Maier & Maier, PLLC (57) ABSTRACT

A maintenance management apparatus manages maintenance of a gas spring provided in an arm of an articulated robot and includes a gas pressure measuring unit that measures a gas pressure inside the gas spring on a regular basis, a maintenance judgement unit that judges whether an abnormality is present in the gas spring based on an amount of decrease in the gas pressure per unit time or per unit operating distance, and a notifying unit that sends a notification based on a judgment result by the maintenance judgement unit to an operator.

1 Claim, 6 Drawing Sheets

(56) References Cited

U.S. PATENT DOCUMENTS

| | | | | |
|---|---|---|---|---|
| 2014/0297037 | A1* | 10/2014 | Hayashi | B25J 9/1694 |
| | | | | 700/258 |
| 2016/0163175 | A1* | 6/2016 | Jenkins | G01G 19/414 |
| | | | | 177/1 |
| 2019/0160676 | A1* | 5/2019 | Harada | B25J 9/1694 |
| 2020/0164529 | A1* | 5/2020 | Kitamura | B25J 19/0012 |
| 2020/0306995 | A1* | 10/2020 | Yerazunis | B25J 15/0009 |
| 2021/0069919 | A1* | 3/2021 | Fujii | B25J 9/1633 |
| 2021/0387362 | A1* | 12/2021 | Yoshino | B25J 19/02 |

FOREIGN PATENT DOCUMENTS

| | | |
|---|---|---|
| JP | H11-015511 A | 1/1999 |
| JP | 2007-098494 A | 4/2007 |
| JP | 2013-169609 A | 9/2013 |
| JP | 2014-195849 A | 10/2014 |
| JP | 5628953 B2 | 11/2014 |
| JP | 2017-159402 A | 9/2017 |
| JP | 2019120031 A | 7/2019 |

* cited by examiner

GAS SPRING MAINTENANCE MANAGEMENT APPARATUS, ROBOT SYSTEM, AND GAS SPRING MAINTENANCE MANAGEMENT METHOD

CROSS-REFERENCE TO RELATED APPLICATIONS

This application is based on and claims priority to Japanese Patent Application No. 2019-187692 filed on Oct. 11, 2019, the content of which is incorporated herein by reference in its entirety.

FIELD

The present invention relates to a gas spring maintenance management apparatus, a robot system, and a gas spring maintenance management method.

BACKGROUND

Robot equipped with gas springs serving as gas balancers are known (for example, see Japanese Unexamined Patent Application, Publication No. 2017-159402; and Japanese Unexamined Patent Application, Publication No. 2014-195849). A servomotor for driving a robot arm that rotates about a horizontal axis receives a load generated by gravity acting on the robot arm. A gas balancer is provided to alleviate the load applied to the servomotor due to gravity. A gas spring has a cylinder for enclosing a gas and a piston rod for compressing the gas inside the cylinder, and generates a repulsion force by compression of the gas. As the piston rod moves relative to the cylinder, the gas pressure inside the cylinder decreases gradually.

Various methods have been proposed to detect a decrease in gas pressure (for example, see Japanese Unexamined Patent Application, Publication No. 2017-159402; Japanese Unexamined Patent Application, Publication No. 2014-195849; Japanese Unexamined Patent Application, Publication No. 2007-098494; and Japanese Unexamined Patent Application, Publication No. Hei 08-313322). For example, in Japanese Unexamined Patent Application, Publication No. 2014-195849, the amount of decrease in gas pressure inside the cylinder is estimated based on the difference between an electrical current value of a servomotor and a reference electrical current value.

SUMMARY

An aspect of the present disclosure provides a maintenance management apparatus that manages maintenance of a gas spring provided in an arm of an articulated robot, the maintenance management apparatus including a gas pressure measuring unit that measures a gas pressure inside the gas spring on a regular basis; a maintenance judgement unit that judges whether an abnormality is present in the gas spring based on an amount of decrease in the gas pressure per unit time or per unit operating distance; and a notifying unit that sends a notification based on a judgment result by the maintenance judgement unit to an operator.

DETAILED DESCRIPTION OF EMBODIMENTS

A gas spring maintenance management apparatus 1 and a robot system 10 according to one embodiment of the present disclosure will now be described with reference to the drawings.

Figure 1:
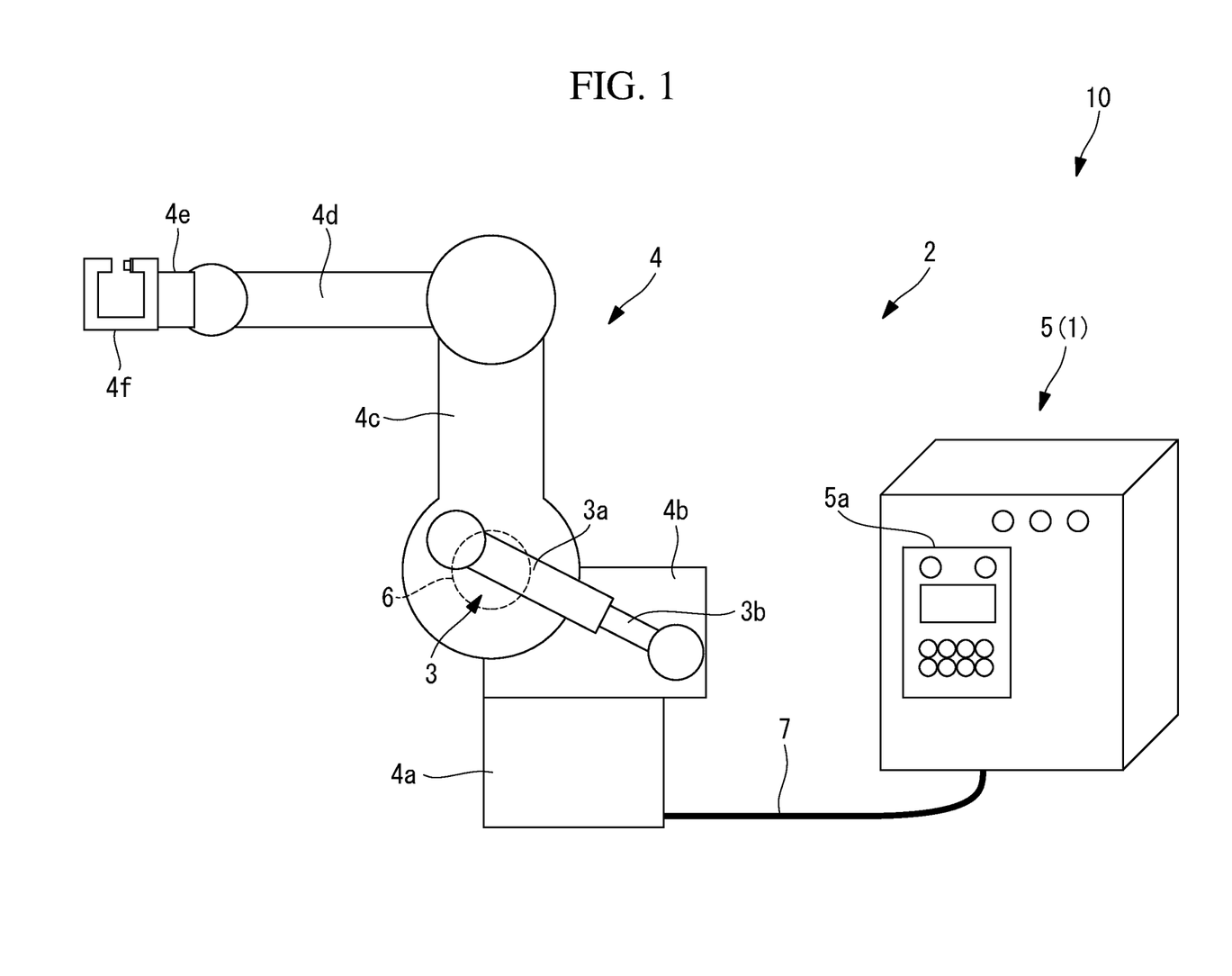
FIG. 1 is an overall structural diagram of a robot system according to one embodiment.

As shown in FIG. 1, the robot system 10 is equipped with an articulated robot 2 and a maintenance management apparatus 1 that manages the maintenance of a gas spring 3 provided in the articulated robot 2.

The articulated robot 2 is equipped with a robot mechanical unit 4 that has at least one arm, a gas spring 3 connected to the at least one arm, and a controller 5 that controls the robot mechanical unit 4. The maintenance management apparatus 1 is provided in the controller 5.

One example of the robot mechanical unit 4 is a vertical articulated robot that has a base 4a, a swivel unit 4b swivelably attached to the base 4a, a lower arm 4c rotatably attached to the swivel unit 4b, an upper arm 4d rotatably attached to the lower arm 4c, and a wrist unit 4e attached to a tip of the upper arm 4d. In this embodiment, the robot mechanical unit 4 is a welding robot, and a welding tool 4f is attached to the wrist unit 4e.

The robot mechanical unit 4 includes servomotors for driving the swivel unit 4b and the arms 4c and 4d. The controller 5 is connected to the robot mechanical unit 4 via a power supply cable 7 and controls the operation of the servomotors.

A load generated by gravity acting on the lower arm 4c is applied to a servomotor 6 for the lower arm 4c that rotates about the horizontal axis. The gas spring 3 is used as a gas balancer that alleviates the load applied to the servomotor 6 due to gravity.

Figure 5:
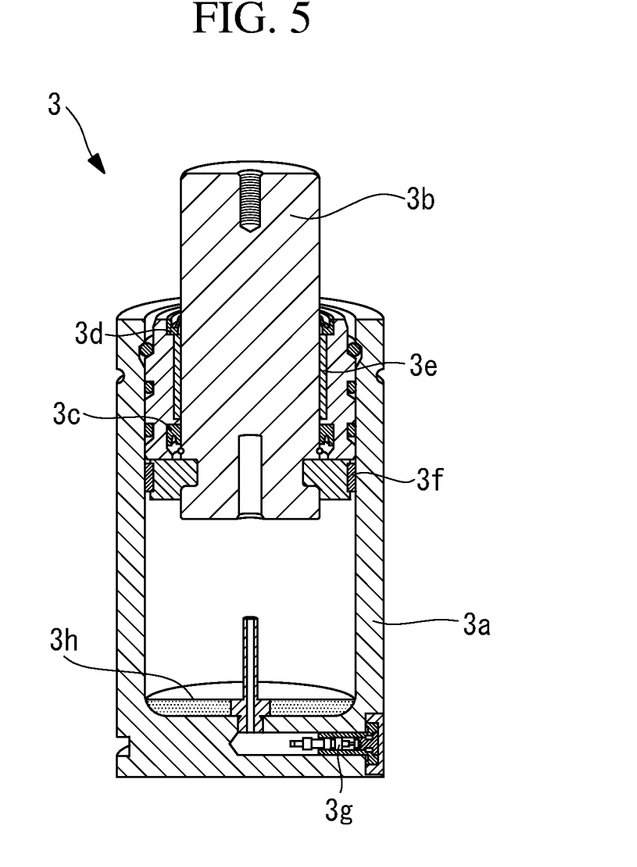
FIG. 5 is a cross-sectional view of one structural example of the gas spring.

As illustrated in FIGS. 1 and 5, the gas spring 3 has a cylinder 3a and a piston rod 3b. An inert compressible gas is enclosed inside the cylinder 3a. The piston rod 3b can slide within the cylinder 3a and compresses the gas inside the cylinder 3a. The cylinder 3a is rotatably attached to the lower arm 4c, and the piston rod 3b is rotatably attached to the swivel unit 4b. As the lower arm 4c rotates, the amount of the piston rod 3b inserted into the cylinder 3a changes, and as the amount of the piston rod 3b inserted into the cylinder 3a increases, the gas pressure inside the cylinder 3a increases.

Figure 2:
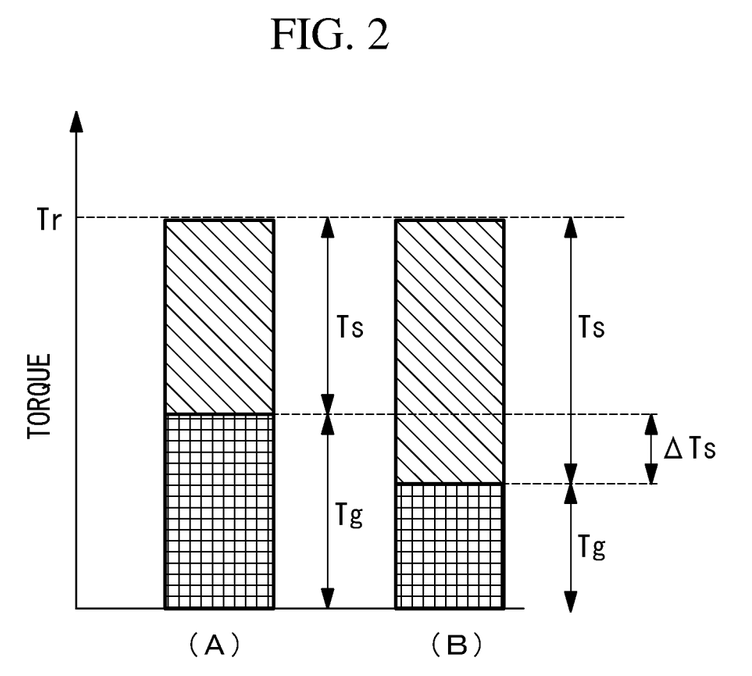
FIG. 2 is a graph showing the relationship between a torque Tg generated by the gas spring and a torque Ts generated by the servomotor.

FIG. 2 shows the torque necessary to control the displacement and speed of the lower arm 4c under particular conditions. The graph (A) shows a state in which an appropriate amount of gas is charged in the gas spring 3, and the graph (B) shows a state in which the gas in the gas spring 3 has leaked and the gas pressure has decreased. Since the gas spring 3 is used as a gas balancer, the torque Tr needed to drive the lower arm 4c is the total of the torque Ts generated by the servomotor 6 and the torque Tg generated by the gas spring 3. The higher the gas pressure in the gas spring 3, the larger the torque Tg. In (B), since the torque Tg of the gas spring 3 decreases by ΔTs due to the gas leakage, the torque Ts generated by the servomotor 6 must be increased by ΔTs in order to obtain the required torque Tr.

Figure 3:
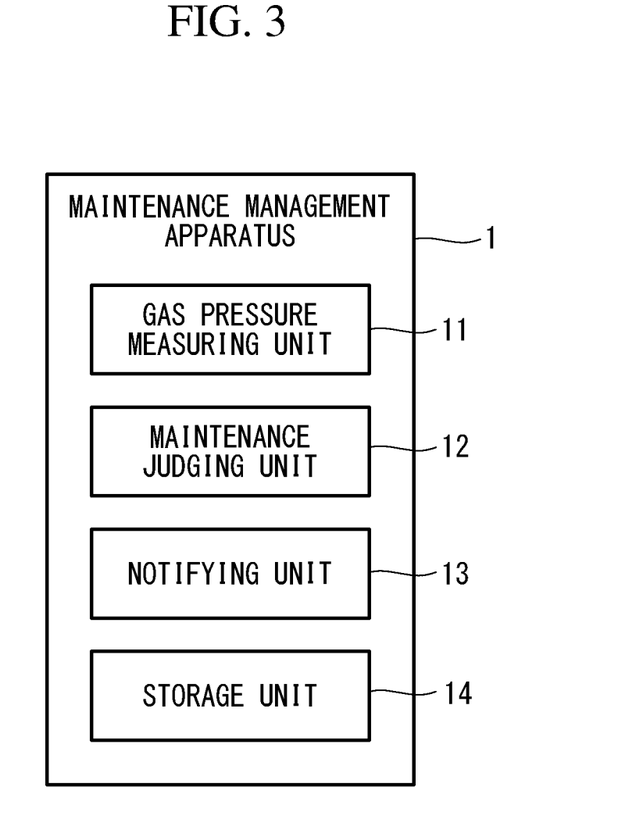
FIG. 3 is a diagram showing a maintenance management apparatus according to one embodiment.

As illustrated in FIG. 3, the maintenance management apparatus 1 is equipped with a gas pressure measuring unit 11 that measures the gas pressure inside the gas spring 3 on a regular basis, a maintenance judgement unit 12 that judges whether an abnormality is present in the gas spring 3 based on the amount of decrease in gas pressure per unit time or per unit operating distance, a notifying unit 13 that sends a notification based on the judgement result obtained by the maintenance judgement unit 12 to the operator, and a storage unit 14 that has a RAM, a ROM, and any other storage device. The maintenance management apparatus 1 has a processor, and the processes of the gas pressure measuring unit 11, the maintenance judgement unit 12, and the notifying unit 13 described below are executed by the processor.

As mentioned above, there is a correlation between the torque Ts of the servomotor 6 and the gas pressure inside the gas spring 3. The gas pressure measuring unit 11 obtains an electrical current value of the servomotor 6 from the control unit in the controller 5 that controls the servomotor 6. Next, the gas pressure measuring unit 11 indirectly measures the gas pressure from the electrical current value by converting the electrical current value of the servomotor 6 into a gas pressure based on a predetermined relationship between the electrical current value of the servomotor 6 and the gas pressure. The value of the measured gas pressure is stored in the storage unit 14 on a time-series basis.

Figure 4A:
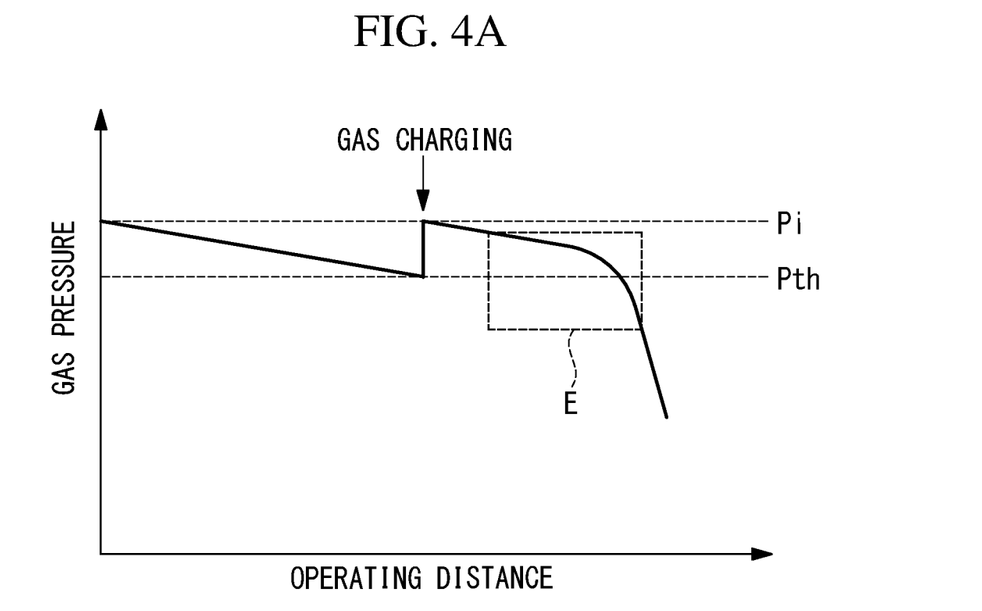
FIG. 4A is a graph showing the change in gas pressure relative to the operating distance of the gas spring.

FIG. 4A shows an example of the change in gas pressure over time. In the graph shown in FIG. 4A, the left half (before gas charging) indicates a typical decrease in gas pressure when the gas spring 3 is normal, and the right half (after gas charging) indicates a decrease in gas pressure when the seal performance of the gas spring 3 is abnormal. In a normal state also, the gas inside the gas spring 3 leaks as the gas spring is used; thus, the gas pressure gradually decreases from the initial value Pi as the operating distance of the gas spring 3 increases.

The gas pressure changes depending on the position and the orientation of the robot mechanical unit 4. Thus, the gas pressure measuring unit 11 preferably measures the gas pressure while the robot mechanical unit 4 assumes a predetermined position and a predetermined orientation. For example, when the gas pressure measuring unit 11 is executing the gas pressure measurement, the controller 5 may control the robot mechanical unit 4 so that the robot mechanical unit 4 assumes a predetermined position and a predetermined orientation.

The frequency of measuring the gas pressure is appropriately set according to the operation status of the articulated robot 2. For example, the gas pressure measuring unit 11 measures the gas pressure once a week or once a month. Alternatively, the gas pressure measuring unit 11 measures the gas pressure each time the operating distance increases by a predetermined distance.

The maintenance judgement unit 12 calculates the rate of decrease ΔP/ΔD, which is the amount of the decrease in gas pressure per unit time or per unit operating distance, each time the gas pressure is measured by the gas pressure measuring unit 11. One example of the unit time is a predetermined operating time of the robot mechanical unit 4, and one example of the unit operating distance is a predetermined operating distance of the gas spring 3. The operating distance of the gas spring 3 is calculated from the total stroke of the lower arm 4c. For example, ΔP is the difference between the gas pressure measured this time and the gas pressure measured the last time, and ΔD is the difference between the operating distance measured this time and the operating distance measured the last time.

Next, the maintenance judgement unit 12 judges whether an abnormality is present in the gas spring 3 by comparing the rate of decrease ΔP/ΔD with a predetermined threshold C. Moreover, the maintenance judgement unit 12 judges the maintenance to be performed on the gas spring 3 based on the judgement result of whether an abnormality is present.

Figure 4B:
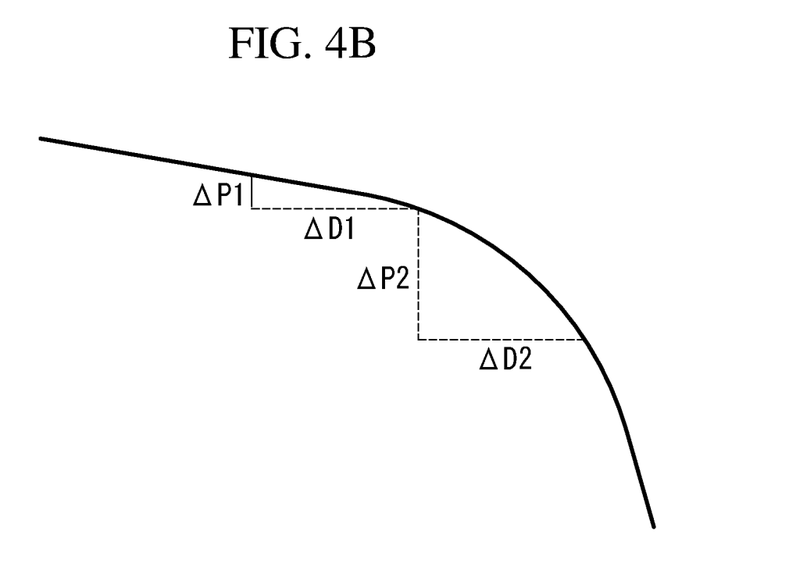
FIG. 4B is an enlarged graph of a region E shown in FIG. 4A.

The threshold C is a value set based on the rate of decrease in gas pressure caused by normal gas leakage. As shown by the left half of FIG. 4A, when the gas pressure decreases due to normal gas leakage only, the gas pressure decreases at a substantially constant rate of decrease ΔP/ΔD relative to the operating distance, and the rate of decrease ΔP/ΔD is equal to or lower than the threshold C. Meanwhile, as shown by the right half of FIG. 4A, when the seal performance of the gas spring 3 is abnormal, the decrease in gas pressure accelerates as the operating distance increases, and the rate of decrease ΔP/ΔD gradually increases and becomes larger than the threshold C. FIG. 4B is an enlarged view of the region E illustrated in FIG. 4A.

When the rate of decrease ΔP/ΔD is equal to or smaller than the threshold C, the maintenance judgement unit 12 judges that no abnormality is present in the gas spring 3 and thus judges that the maintenance to be performed is charging the gas. Next, the maintenance judgement unit 12 calculates the time remaining until the gas pressure decreases to a predetermined threshold Pth by assuming that the decrease in gas pressure continues at a rate of decrease ΔP/ΔD. The threshold Pth is a lower limit of the gas pressure at which the gas spring 3 can output a torque Tg necessary for the gas spring 3 to serve as a gas balancer. The remaining time may be the operating distance of the gas spring 3 or the operating time of the robot mechanical unit 4 taken until the gas pressure decreases to the threshold Pth.

Meanwhile, when the rate of decrease ΔP/ΔD is larger than the threshold C, the maintenance judgement unit 12 judges that an abnormality is present in the gas spring 3 and thus judges that the maintenance to be performed is replacement of the gas spring 3.

FIG. 5 shows one structural example of the gas spring 3. The seal performance inside the cylinder 3a is mainly achieved by a rod seal 3c. Scratches on the surface of the piston rod 3b or the foreign matter and the like stuck between the piston rod 3b and the rod seal 3c degrade the seal performance between the piston rod 3b and the rod seal 3c, resulting in abnormal seal performance of the gas spring 3.

For example, foreign matter generated by the operation of the robot mechanical unit 4, such as spatters generated by welding, may adhere to the exposed surface of the piston rod 3b. Penetration of the foreign matter into inside the gas spring 3 is usually prevented by a dust seal 3d. However, the foreign matter may pass through the dust seal 3d, enter a gap between the piston rod 3b and a rod guide 3e, and scratch the surface of the piston rod 3b. In addition, foreign matter such as abrasion powder or the like generated by sliding between parts of the gas spring 3 may become stuck between the piston rod 3b and the rod seal 3c.

Furthermore, the seal performance of the rod seal 3c may be degraded due to deterioration with age, deterioration by heat, chemical attacks by foreign matter, etc.

In FIG. 5, reference sign 3f represents a piston guide that guides sliding of the piston rod 3b in the cylinder 3a, 3g represents a check valve for charging a gas into the cylinder 3a, and 3h represents lubrication oil.

When it is judged that no abnormality is present in the gas spring 3, the notifying unit 13 sends a notification regarding the remaining time. For example, the notifying unit 13 causes an operation panel 5a of the controller 5 to display an instruction instructing the charging of gas into the gas spring 3 within the remaining time. Meanwhile, when it is judged that an abnormality is present in the gas spring 3, the notifying unit 13 sends the operator a notification regarding the replacement of the gas spring 3. For example, the notifying unit 13 causes the operation panel 5a to display an instruction that instructs prompt replacement of the gas spring 3. The notifying unit 13 may indicate the aforementioned instruction on a display of a portable teach pendant (not illustrated) of the controller 5 instead of the operation panel 5a.

Figure 6:
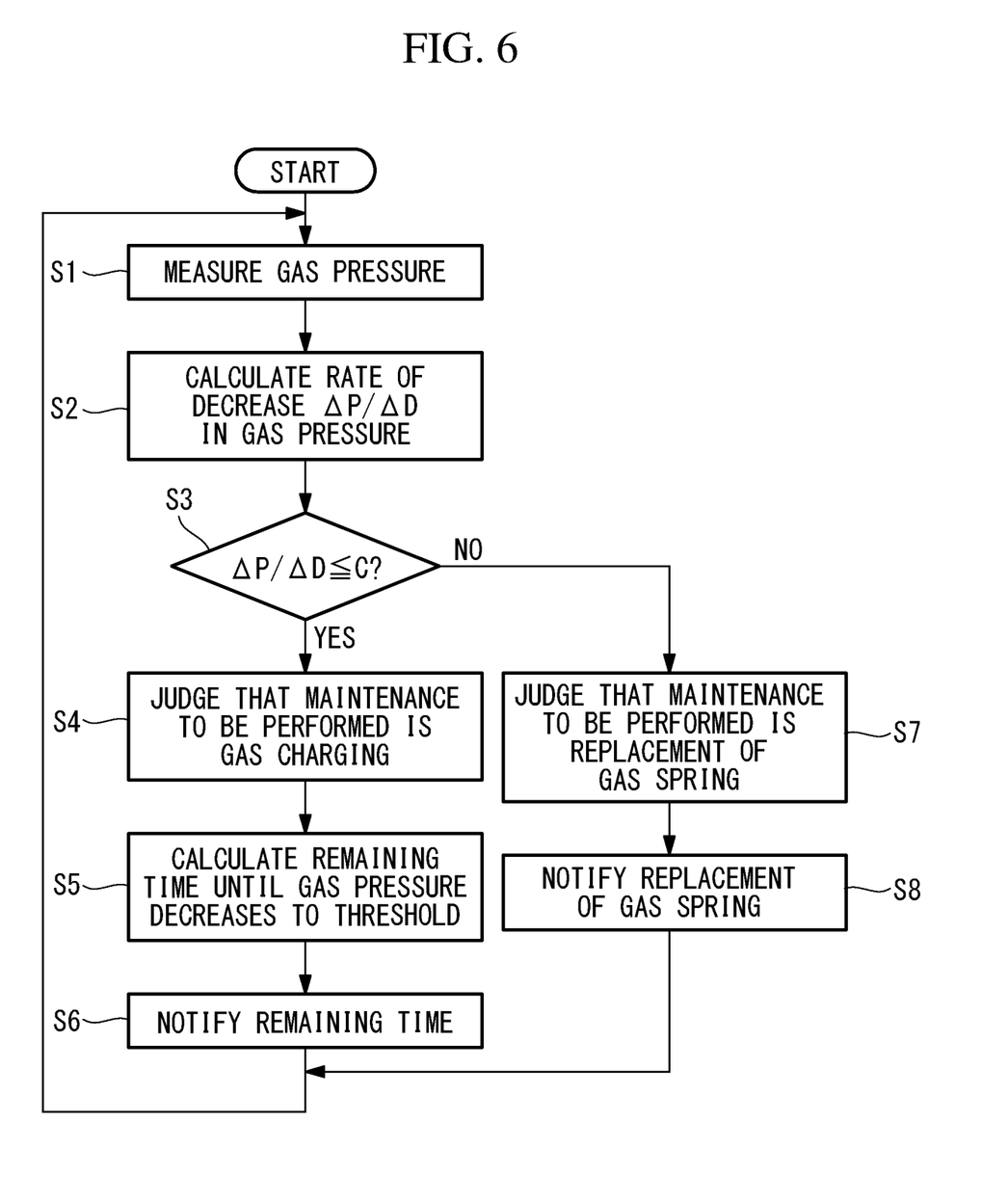
FIG. 6 is a flowchart showing a gas spring maintenance management method.

Next, a method for managing the maintenance of the gas spring 3 by using the maintenance management apparatus 1 is described with reference to FIG. 6.

The gas pressure measuring unit 11 measures the gas pressure inside the gas spring 3 on a regular basis (step S1). After the gas pressure measurement, the maintenance judgement unit 12 calculates the rate of decrease $\Delta P/\Delta D$, which is the amount of decrease in gas pressure per unit time or per unit operating distance (step S2), and, based on the rate of decrease $\Delta P/\Delta D$, whether an abnormality is present in the gas spring 3 and what maintenance should be performed on the gas spring 3 are judged (step S3).

Specifically, when the rate of decrease $\Delta P/\Delta D$ is equal to or smaller than the threshold C (YES in step S3), the maintenance judgement unit 12 judges that no abnormality is present in the gas spring 3, thus judges that the maintenance to be performed is charging the gas (step S4), and calculates the remaining time until the gas pressure decreases to the threshold Pth (step S5). Next, a notification regarding the remaining time is sent to the operator via the notifying unit 13 (step S6).

Based on the notification, the operator charges the gas into the cylinder 3a from the check valve 3g within the remaining time, and returns the gas pressure inside the cylinder 3a to the initial value Pi.

Meanwhile, when the rate of decrease $\Delta P/\Delta D$ is larger than the threshold C (NO in step S3), the maintenance judgement unit 12 judges that an abnormality is present in the gas spring 3 and thus judges that the maintenance to be performed is replacing the gas spring 3 (step S7). Next, a notification regarding replacement of the gas spring 3 is sent to the operator via the notifying unit 13 (step S8).

Based on of the notification, the operator promptly replaces the gas spring 3 with a new one.

As mentioned above, the gas pressure in the gas spring 3 gradually decreases with the operation of the robot mechanical unit 4; thus, gas charging is necessary on a regular basis as routine maintenance for the gas spring 3. Thus, if the operator is notified of the fact of the decrease in gas pressure or the amount of decrease in gas pressure, the operator first charges gas into the gas spring 3. However, if the seal performance of the gas spring 3 is abnormal, the gas pressure would immediately decrease due to rapid gas leakage after the resumption of operation of the robot mechanical unit 4 despite the fact that the gas has just been charged. At this stage, the operator becomes aware of the abnormality in the gas spring 3, and replaces the gas spring 3. In this case, extra steps and maintenance become necessary, and the downtime of the production line caused by the maintenance of the articulated robot 2 is prolonged.

In contrast, according to this embodiment, whether the decrease in gas pressure is caused by normal gas leakage or by abnormal seal performance of the gas spring 3 is judged based on the rate of decrease $\Delta P/\Delta D$ in gas pressure. Moreover, a notification of appropriate maintenance that corresponds to the cause of the decrease in gas pressure is sent to the operator. The operator can identify, through the notification, whether the way in which the gas pressure decreases is normal or abnormal, and thus can perform appropriate maintenance on the gas spring 3 without hesitation.

In addition, when the seal performance of the gas spring is abnormal, the abnormality in the gas spring 3 can be found at an early stage based on the rate of decrease $\Delta P/\Delta D$ in gas pressure, and the operator can be notified of the need to replace the gas spring 3 at an early stage.

When the gas spring 3 is normal, the remaining time for which the articulated robot 2 can operate normally is notified to the operator. The operator can perform maintenance on the gas spring 3 in a planned manner based on the notified remaining time.

The gas pressure measured by the gas pressure measuring unit 11 changes depending on the temperature inside the cylinder 3a. Thus, the maintenance judgement unit 12 may convert the measured gas pressure into a gas pressure at a predetermined temperature and calculate the rate of decrease $\Delta P/\Delta D$ by using the gas pressure at that predetermined temperature.

For example, the maintenance judgement unit 12 acquires a temperature T of the surrounding of the gas spring 3 from a temperature sensor provided in the gas spring 3, and converts the measured gas pressure P into a gas pressure P(20) at 20° C. by using the following equation:

$$P(20)=P\times(273.15+T)/(273.15+20)$$

In the aforementioned embodiment, the gas pressure measuring unit 11 indirectly measures the gas pressure from the electrical current value of the servomotor 6; alternatively, the gas pressure may be measured by using other means. For example, the gas pressure measuring unit 11 may be equipped with a pressure sensor provided inside the cylinder 3a, and the gas pressure may be directly measured with the pressure sensor.

In the aforementioned embodiment, the maintenance management apparatus 1 is provided in the controller 5; alternatively, the maintenance management apparatus 1 may be separate from the controller 5. For example, the maintenance management apparatus 1 may be a computer connected to the controller 5.

Alternatively, some of the functions of the maintenance management apparatus 1 may be performed by an upper-level control system connected to multiple articulated robots 2. For example, the gas pressure measuring unit 11 may be provided in each of the articulated robots 2, and the maintenance judgement unit 12 and the notifying unit 13 may be provided in the upper-level control system.

The upper-level control system receives data regarding the gas pressure from each of the articulated robots 2 and judges whether an abnormality is present in the gas spring 3 of each of the articulated robots 2 and makes a judgment regarding the maintenance.

When one upper-level control system comprehensively manages the information regarding the maintenance of the gas springs 3 of the multiple articulated robots 2 as such, the operator can perform maintenance on multiple gas springs 3, such as simultaneously charging gas into multiple gas springs 3, in a more planned manner.

The invention claimed is:

1. A robot system comprising:
an articulated robot including:
a robot mechanical unit having at least one arm;
a gas spring provided in the at least one arm and configured to act as a gas balancer that alleviates a load on a servomotor that drives the at least one arm; and
a controller that is configured to control the robot mechanical unit; and
a maintenance management apparatus configured to manage the maintenance of the gas spring, the maintenance management apparatus comprising:
  a gas pressure measuring unit configured to directly measure a gas pressure inside the gas spring with a pressure sensor on a regular basis;
  a maintenance judgement unit configured to judge that no abnormality is present in the gas spring, judge maintenance to be performed on the gas spring is charging gas, and calculate a remaining time until the gas pressure decreases to a predetermined pressure threshold, when an amount of decrease in the gas pressure per unit time or per unit operating distance is equal to or smaller than a predetermined threshold; and
  a notifying unit configured to conduct a notification related to the remaining time to an operator.

* * * * *